(12) United States Patent
Tsao

(10) Patent No.: US 8,639,788 B2
(45) Date of Patent: Jan. 28, 2014

(54) METHOD AND APPARATUS FOR WEB BASED STORAGE ON DEMAND

(75) Inventor: Sheng (Ted) Tai Tsao, San Jose, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 1096 days.

(21) Appl. No.: 12/013,813

(22) Filed: Jan. 14, 2008

(65) Prior Publication Data
US 2008/0115144 A1  May 15, 2008

Related U.S. Application Data

(62) Division of application No. 10/713,905, filed on Aug. 12, 2002, now Pat. No. 7,379,990.

(51) Int. Cl.
*G06F 15/173* (2006.01)

(52) U.S. Cl.
USPC .................. 709/223; 709/213; 709/218

(58) Field of Classification Search
USPC .............................. 709/213, 218, 223
See application file for complete search history.

(56) References Cited

U.S. PATENT DOCUMENTS

| 6,606,690 B2 * | 8/2003 | Padovano ............. 711/148 |
| 6,959,373 B2 * | 10/2005 | Testardi .............. 711/203 |
| 2009/0313503 A1 * | 12/2009 | Atluri et al. .......... 714/19 |

* cited by examiner

*Primary Examiner* — Adnan Mirza

(57) ABSTRACT

Rapid demanding for storage capacity at internet era requires a much flexible and powerful storage infrastructure. Present invention disclosed a type of storage system based a model of centrally controlled distributed scalable virtual machine. In this model, one or more service pools including virtual storage service pool and application service pools can be automatically created to meet the demands for more storage capacity from various applications. Specially this model provide a solid foundation for distributing storage volumes for supporting storage on-demand and sharing with exceptional management capabilities.

39 Claims, 8 Drawing Sheets

Distributed Virtual SAN Infrastructure

Virtual SAN Storage Pool Automatic Configuration Protocol

The UDP packet format used by "Virtual SAN Auto Configuration Protocol"

Example of Storage Volume Information of an IP SAN Unit

Note: Each volume may further be partitioned into small chunk of partition.

A Hypothetical Example of Storage Volume Requests and Assignments

Direct Attached Storage System:

In-Band Accessed Virtual SAN

Recovery Scheme of the Distributed Virtual SAN Infrastructure

METHOD AND APPARATUS FOR WEB BASED STORAGE ON DEMAND

CROSS-REFERENCE TO RELATED APPLICATION(S)

The present application is a divisional patent application based on U.S. patent application Ser. No. 10/713,905, filed on Aug. 12, 2002, which in turn is converted from provisional application 60/402,626 and now is a U.S. Pat. No. 7,379,990. The application Ser. No. 10/713,905 had tried to claim as a continuation application of a pending application on the filing date, yet referenced a provisional application No. 60/401,238, that is filed under the name of the same inventor. All above applications are herein incorporated by references in their entireties for all purpose.

FIELD OF THE INVENTION

The present invention generally relates to computer communications network. More specifically, the present invention relates to web based data storage systems.

BACKGROUND OF THE INVENTION

Today's corporate IT professionals typically face many challenges to handle the ever increasing information and data. To handle large amount of data, many organizations expand their storage capacity by employing manage storage systems locally in order to maintaining their normal business operating. A conventional approach is to use IP based network attached storage ("NAS"), which effectively provides data storage and services for end users. Moreover, at the enterprise level, the majority storage systems are directly attached or connected to server(s) or host(s) as shown in FIG. 7. These server(s) and/or host(s) are typically used as raw block data devices through conventional communication connection media, such as traditional IDE, SCSI, Fibre Channel, or Ethernet.

The server, which is directly attached to a storage system as illustrated in FIG. 7 typically has many drawbacks, which are described as following:

a typical conventional storage management system is only capable of handling 4 TB (terabytes) of data, which is usually not good enough to meet the demands for more storage capacity in an enterprise environment;

The most of servers, which are directly attached to storage systems, have problems for further expanding their storage capacity. For example, it may require to purchase new servers in order to increase storage capacity;

The storage being attached to a server can only be accessed by the attached server and can not be shared by other servers even if server's storage availability is not evenly distributed across all servers within a organization;

Each attached storage system has to be managed separately and this is a nightmare for IT professionals;

With the attached storage system, the backup/restore has to go through the data network, this will tax or reduce the network performance;

A typical SCSI connection only allows a 12-meter distance for data accessing with 15 storage devices. Similarly, Fibre Channel is limited to 10 kilometers communication distance. Distance limitation effectively prevents them from being the best choice for disaster recovery of the storage system; and The Fibre Channel based storage system cannot handle well for the interoperability. Also, Fibre Channel based storage system is expensive to build and to maintain.

FIG. 8 shows a conventional type of virtual SAN, which is in-band controlled and accessed with which the data path from hosts (1 of FIG. 8) to the SAN units (4 of FIG. 8) going through virtual SAN control management station (2 of FIG. 8). It is not efficient in term of accessing the data by the hosts because the virtual SAN control management station can easily be a performance bottleneck. Similarly, the scalability of this type of virtual SAN is poor.

SUMMARY

With rapid development of high speed communication technology, the problems mentioned above can be solved by an IP based out-band accessed distributed virtual SAN infrastructure (FIG. 1) of this invention. With this invention, each host (1 of FIG. 1) can directly access IP based SAN units (4 of FIG. 1) without going through control management station (3 of FIG. 1). The IP based out-band accessed distributed virtual SAN infrastructure (FIG. 1) actually represents an example of central controlled distributed scalable virtual machine system (CCDSVM) (FIG. 9). Wherein, each system units actually is a SAN unit (4 of FIG. 1), specifically is an IP based SAN unit.

With this invention, each SAN unit (4 of FIG. 1) can be accessed by one or more hosts (1 of FIG. 1) and each host can access one or more SAN units (FIG. 6). In addition, the storage accessing goes directly through communication link (2 of FIG. 1) between hosts (1 of FIG. 1) and SAN units (4 of FIG. 1) without involvement of the control management station (3 of FIG. 1). Further, the SAN units (4 of FIG. 1) can be dynamically added without interrupting normal data accessing from hosts (1 of FIG. 1) and are controlled, monitored, and managed by a control management station (3 of FIG. 1) through a management console (10 of FIG. 1). The control management station (3 of FIG. 1) may also accept storage volume/partition requests from each host (1 of FIG. 1), and assign the matched volumes/partitions of the SAN units (4 of FIG. 1) to these hosts. Therefore, each host (1 of FIG. 1) could directly access the right volumes/partitions of assigned SAN units without going through the control management station again.

This invention will become understood with reference to the following description, claims, and accompanying figures.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The following terms are used through out this patent application to describe the present invention. A central controlled distributed scalable virtual machine ("CCDSVM") system allows a control management nation to control a group of computing systems and to provide distributed services to client systems across the Intranet, Internet, and/or LAN environment. Storage media includes magnetic hard disk drives, solid state disk, optical storage drive, and memory card etc. Storage connection and control media may include controller of IDE, SCSI, Fibre optical, Ethernet, USB, or wireless media, and/or other related cables etc. Each controller of storage media such as Raid, IDE, or SCSI controller may control multiple storage media drivers on a computing system. Storage system includes one or more storage media devices, storage connections, and/or storage media controllers. Storage system also contains related software modules for delivering storage services.

Storage area network ("SAN") is a storage system that is capable of providing block data services to various computer hosts through storage connection media, such as Fibre-optical cable, Ethernet cable or Internet Protocol ("IP") based connection media protocol or non-IP based connection media protocol. The non-IP based connection media protocol, in one example, includes Fibre-Channel. IP SAN uses IP based protocols to provide storage raw block data services. All discussions of the SAN in this invention are within the scope of a model of central controlled distributed scalable virtual machine ("CCDSVM").

DNS stands for domain name server of network technology. DNS is an Internet software infrastructure and is capable of identifying network addresses for its peer systems. For example, the network addresses may be used to communicate with the peer systems. A Simple Network Management Protocol ("SNMP") is a standard Internet protocol. A SNMP trap is a user datagram protocol ("UDP") packet, which may be used to send by a SNMP daemon on a SNMP agent system to a SNMP network management station via network links.

Figure 1:
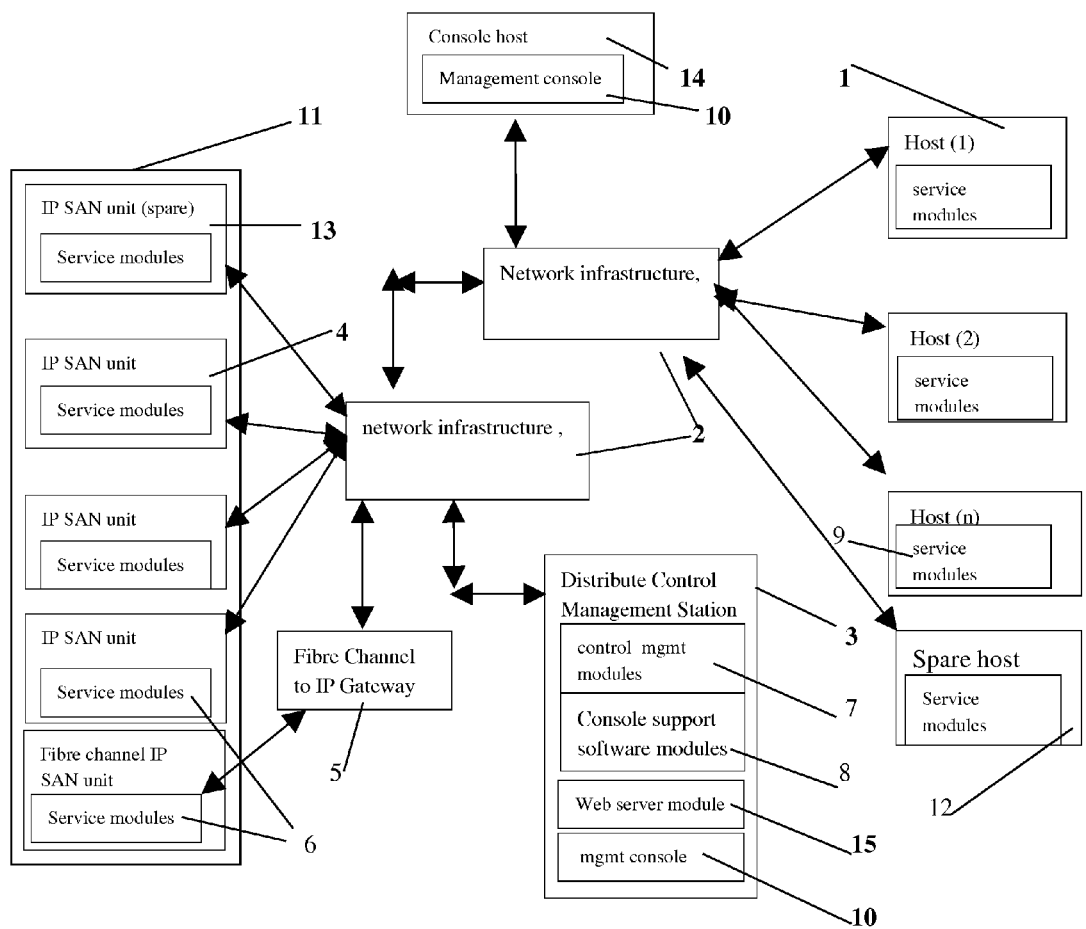
FIG. 1 illustrates a distributed virtual storage area of network ("SAN") infrastructure in accordance with one embodiment of the present invention.

FIG. 1 shows an example of a simplified block diagram of IP based out-band accessed distributed virtual SAN infrastructure. The distributed virtual SAN infrastructure includes a plurality of hosts (1), network infrastructures (2), a control management station (3), virtual storage service pool (11) having a plurality of IP SAN units (4), and a management console (10). In one embodiment, each of the hosts (1) contains service software modules 9. The service software modules (9) are configured to communicate with a control management software module (7) of the control management station (3) for obtaining information of a specific one of the IP SAN units (4). The service software modules (9) also operable to communicate with service software modules (6) of any one of the IP SAN units (4) to access block data provided by any one of the SAN units (4). For example, each of the hosts 1 can create a local file system or a local raw device based database by requesting and using block data (storage volume) provided by any one of the SAN units 4. The service software modules (9) can be coded or implemented with any suitable programming languages such as C, C++, Java or others. The service software modules (9) may also use any suitable protocols such as IP based or non-IP based protocols.

The host (1), in one embodiment, could be a server, a desktop, a laptop PC, etc., which needs to access block data storage. The spare host (12) represents a part of recovery scheme that could be implemented in a CCDSVM environment.

Network infrastructure (2) comprises many kind of communication links, which could be a department LAN, a corporate intranet, an Internet infrastructure or others. In one embodiment, network infrastructure (2) includes switches, routers, gateways, cables (Ethernet, optical Fibre), wireless communication media, or others. The network infrastructure (2) provides data path between the plurality of hosts (1), the distribute control management station (3), and the plurality of the SAN Units (4). The network infrastructure (2) also includes software infrastructure such as DNS or DHCP for facilitating systems on the net to identifying target addresses, which are used for sending or receiving data within a network domain or in a cross-domain network environment.

It should be noted that DNS and/or other Internet address identification mechanism may be used when a message or data stream is sent from a system A to a system. In addition, the message is sent from source system A to target system B via communication link of this network infrastructure.

Control management nation (3) includes distributing control management software modules (7) and console support software modules (8). To support web-based console, it requires the web server software (15). The distribute control management software modules (7) communicate with service modules (6) of each of the IP SAN units (4) to retrieve storage information for constructing a virtual SAN storage service pool (11). The communication between the distributed control management software modules (7) and the service modules (6) of each of the IP SAN units (4) is further configured to monitor each of the IP SAN units, and to perform various system operations, which include storage configuration and partitioning etc. The control management software modules (7) also communicates with service software modules (9) of each of the hosts (1) for distributing storage volumes to any one of the hosts (1) upon a request. The distribute control management software modules (7) can be implemented with any suitable programming languages such as C, C++, Java, XML, etc. The communication protocols between control management station (3) and IP SAN units (4) could be any suitable IP based protocols. The communication between control management station (3) and hosts (1) can be any suitable IP base or non-IP based protocols.

The console support software modules (8) employ inter-process communication mechanism to obtain information relating to any one of the IP SAN units (4) from the distributed control management software modules (7). The console support software modules (8) further provide information to web server software (15) through the inter-process communication mechanism. The console support software modules (8) can be implemented with any suitable programming languages such as C, C++, Java, XML, etc.

The web server software (15) communicates with management console software (10) on the console host (14) through web protocol such as HTTP. The web server software (15) is configured to provide end-user a centralized storage management capability within the entire distributed virtual SAN infrastructure for any end user across a communication network. The web server software (15) could be commercially available software or other proprietary software.

To simplify foregoing discussion, the communication path mentioned above will be simply referred to as the console support software modules (8), which communicate (send/receive) with the management console (10) on the console host (14) (without further mentioning the role and function of web server software (15) on the distribute control management station 3).

In addition, to support non-web based console, the web server software (15) on the control management station (3) is often not required. In this case, the console support software modules (8) could communicate with the management console software (10) with a suitable protocol other than a web protocol such as HTTP.

Figure 5:
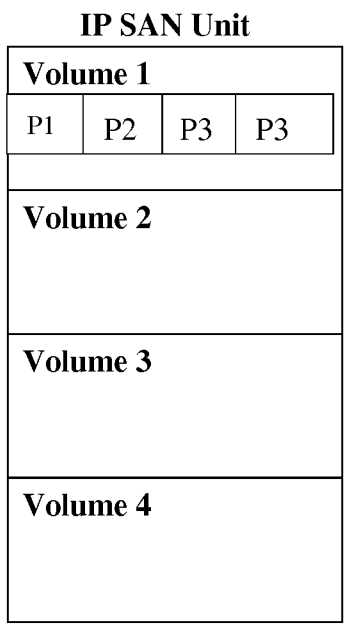
FIG. 5 illustrates an Example of Storage Volume Information of an IP SAN Unit in accordance with one embodiment of the present invention.

The virtual storage pool (11) includes a plurality of IP SAN units (4), wherein each of the IP SAN units further includes service modules (6) and is configured with storage media, storage communications and control media. The storage hardware media of each of the IP SAN units (4), for example a disk drives is configured to have one or more logical volumes. Each storage volume, in one embodiment, is further partitioned into several portions, as shown in FIG. 5, each of the IP SAN units (4) further comprises block data service and other service software modules (6). The service software module (6) is configured to communicate with distribute control management station (3) for providing storage information and for performing storage operations. The service software modules (6), in another embodiment, are further configured to communicate with service software modules (9) of each of the hosts (1) for providing block data services to any one of the hosts (1). The service software modules (6) can be implemented by any suitable programming languages such as C, C++, Java, etc and they may employ any suitable IP based communication protocols for data transferring.

In one embodiment, the control management station (3) and organizes the plurality of IP SAN units (4) to form the virtual storage service pool (11). The virtual storage pool (11) may contain information relating to IP addresses, the storage volumes of the block data, their addresses and sizes of each of the IP SAN units (4). A spare IP SAN unit (13) in the embodiment represents a part of recovery scheme used in the centrally controlled distributed scalable virtual machine environment.

Fibre channel to IP gateway (5) in the embodiment is a component that is configured to provide translation between Fibre Channel based protocol and IP based protocol so that any Fibre Channel based SAN unit in the distributed virtual SAN infrastructure will appear as if a IP based SAN unit to the rest of the distributed virtual SAN infrastructure (FIG. 1).

Fibre channel SAN unit is similar to an IP SAN unit (4) except it uses Fibre Channel storage controller, which uses Fibre Channel protocol to communicate with other parties in the distributed virtual SAN infrastructure across the communication network. In addition, any Fibre Channel SAN unit appears as an IP based SAN unit to the distributed virtual SAN once it connects to the Fibre Channel to IP gateway (5 of FIG. 2). Therefore, to simplify the foregoing discussion, a fibre channel SAN unit will be treated similarly as an IP SAN unit in all of following discussion without additional comments.

The management console on the console host (14), which has been described in pending patent application of "Concurrent Web Based Multi-Task Support for Control Management System" by the same author. The management console could be a commercially available web browser or a proprietary Web browser. A web browser is able to communicate with web server software (15) on the control management station (3) through a web protocol such as HTTP. The Web browser could be implemented by any suitable programming languages such as C, C++, Java, XML, etc. In addition, the management console software module (10) could be a networked software module other than a web browser software. In this case, any other suitable network protocols can be used instead of using web protocol such as HTTP.

To simplify the foregoing discussion, the communication path between the management console (10) on the console host (14) and the console support software modules (8) on the control management station (3) will not further mention the role or function of the web server software module (15) in this invention.

From the management console (10), multiple concurrent system operations and tasks can be performed for the entire distributed virtual SAN infrastructure. There are may be one or more management consoles of distributed virtual SAN infrastructure anywhere on the communication network.

Figure 2:
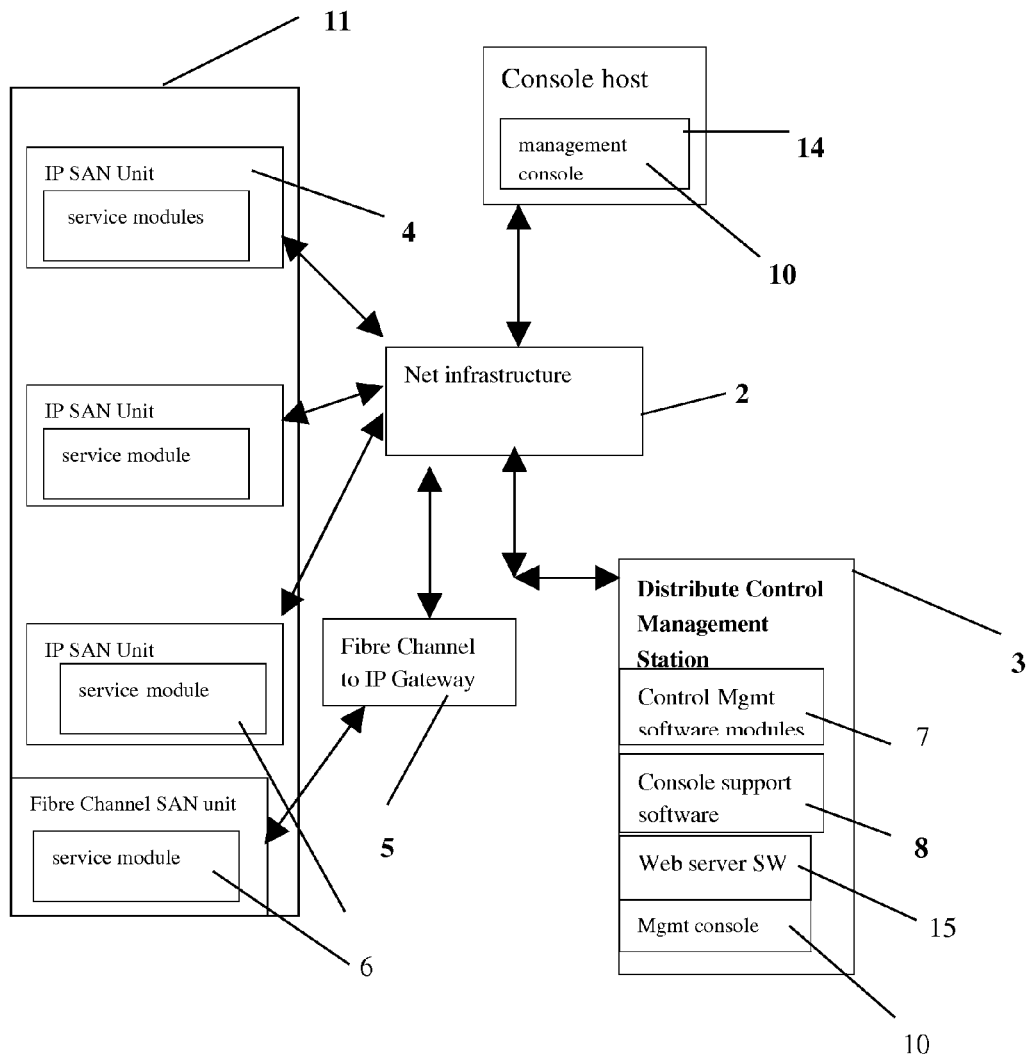
FIG. 2 illustrates actual Components of Distributed Virtual SAN in accordance with one embodiment of the present invention.

FIG. 2 illustrates a portion of FIG. 1 relating to an actual virtual SAN. The plurality of SAN units form a virtual storage service pool (11). The virtual storage service pool (11) may contain information of each of the IP SAN units' IP address, the storage volumes on each storage device and their sizes, etc.

Figure 3:
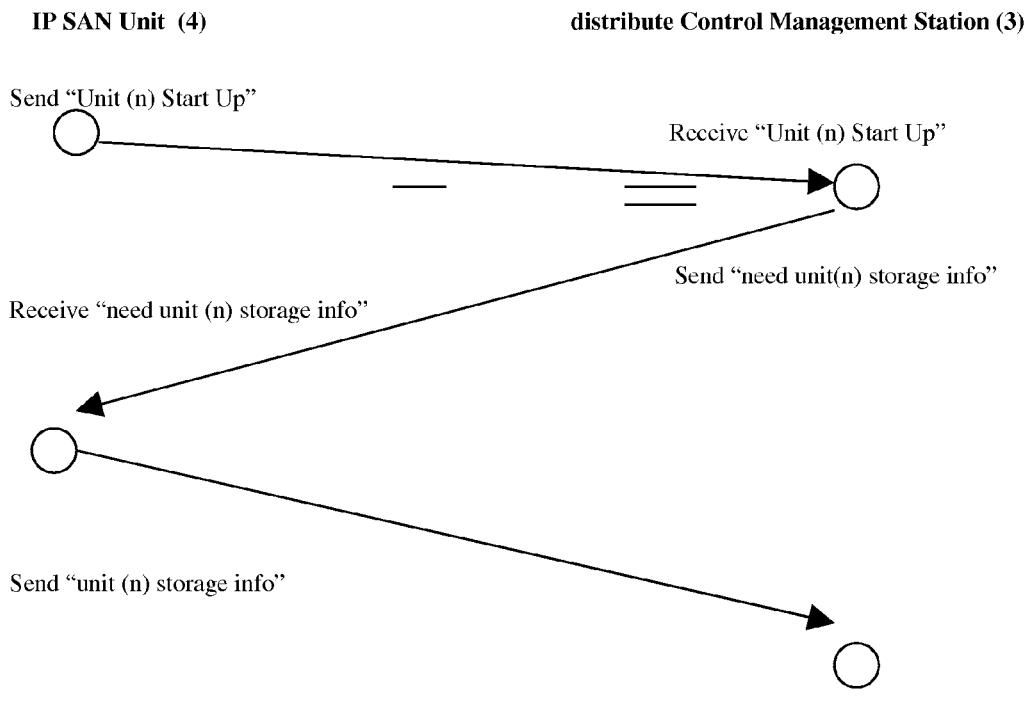
FIG. 3 illustrates Virtual SAN Automatic Configuration Protocol in accordance with one embodiment of the present invention.
Figure 3:
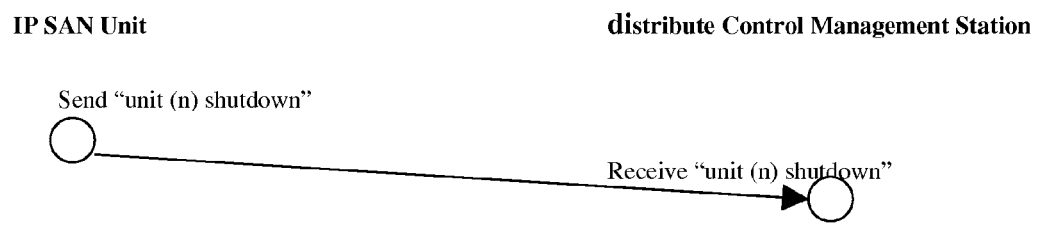

FIG. 3 shows a protocol of virtual SAN automatic configuration and building as well as shutting down a virtual SAN. The packet format used with this protocol is described in FIG. 4.

Figure 4:
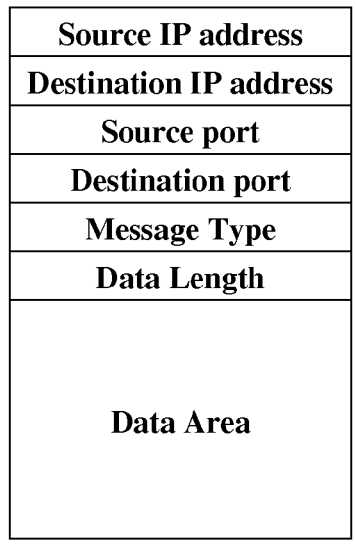
FIG. 4 illustrates a Virtual SAN Auto Configuration Protocol Packet format in accordance with one embodiment of the present invention.

FIG. 4 shows the message format, which is used by "Virtual SAN Automatic Configuration Protocol" for sending and receiving a packet, wherein the source and destination IP address is included that means the storage communication can be independent of naming identification function such as DNS in one embodiment.

FIG. 5 illustrates a storage device' layout in an IP SAN unit, wherein the storage layout may be further divided into multiple volumes and each of the volumes may be further divided into multiple partitions. Each of the volumes refers to a logical storage unit in this discussion and it might contain multiple pieces of storage spaces from multiple storage hardware media.

Figure 6:
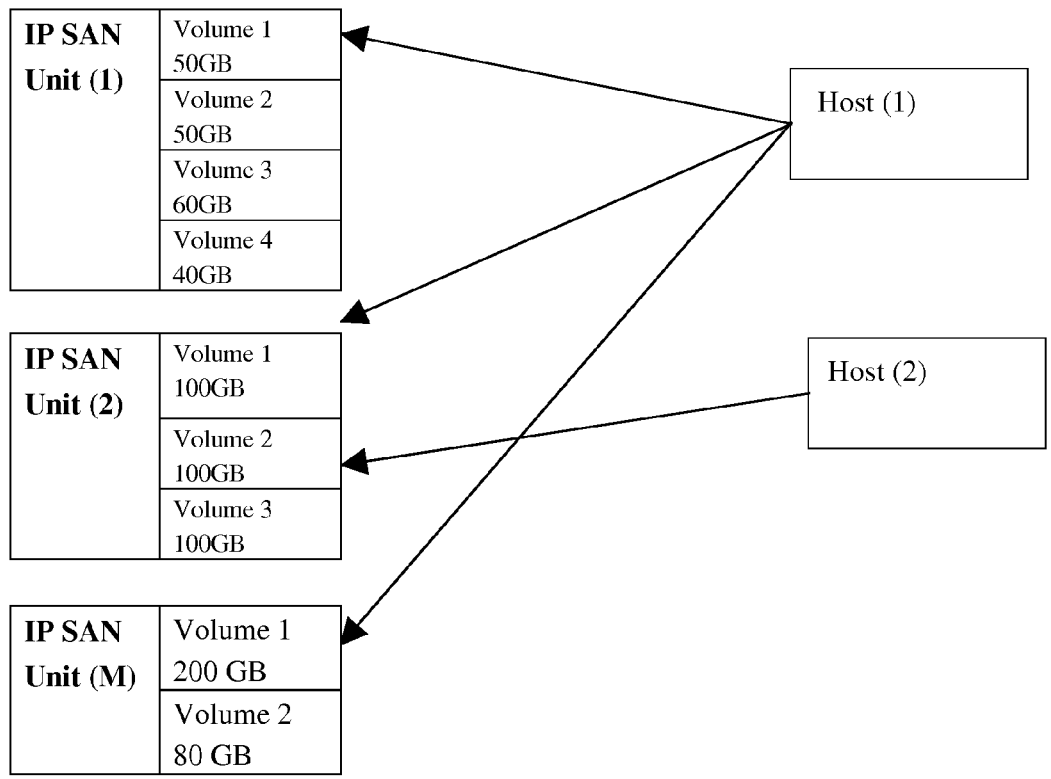
FIG. 6 illustrates a hypothetical example of Storage Volume Requests and Assignment in accordance with one embodiment of the present invention.

FIG. 6 is a simplified and a portion of FIG. 1, which shows a hypothetical example of how hosts are configured to access the storage volume of IP SAN units. Where each of the IP SAN units is a portion of virtual storage pool (11 of FIG. 2) and each of the hosts is substantially the same as presented in FIG. 1.

Figure 8:
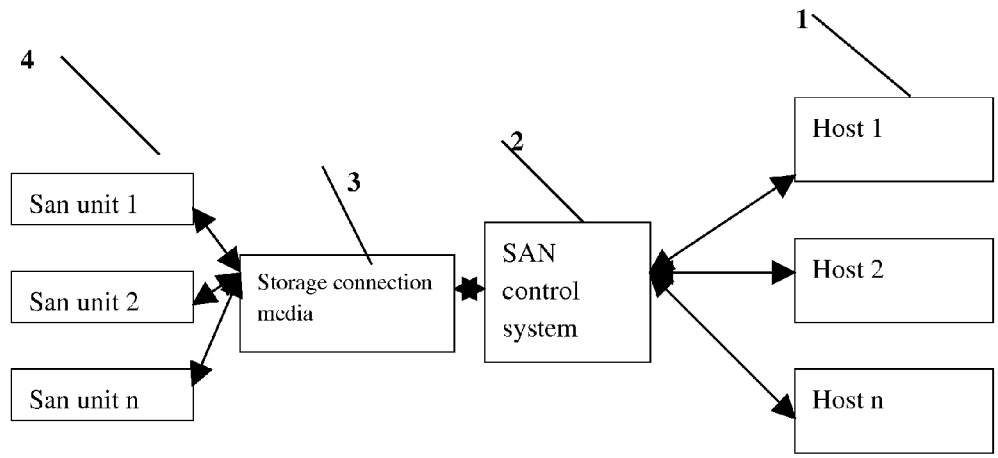
FIG. 8 is an In-Bound Accessed Virtual Storage System.

FIG. 8 is a block diagram illustrating an In-Band Accessed Virtual SAN. FIG. 8 shows another type of virtual SAN, wherein, the actual storage data path from hosts to IP SAN units has to go through control management station.

Figure 9:
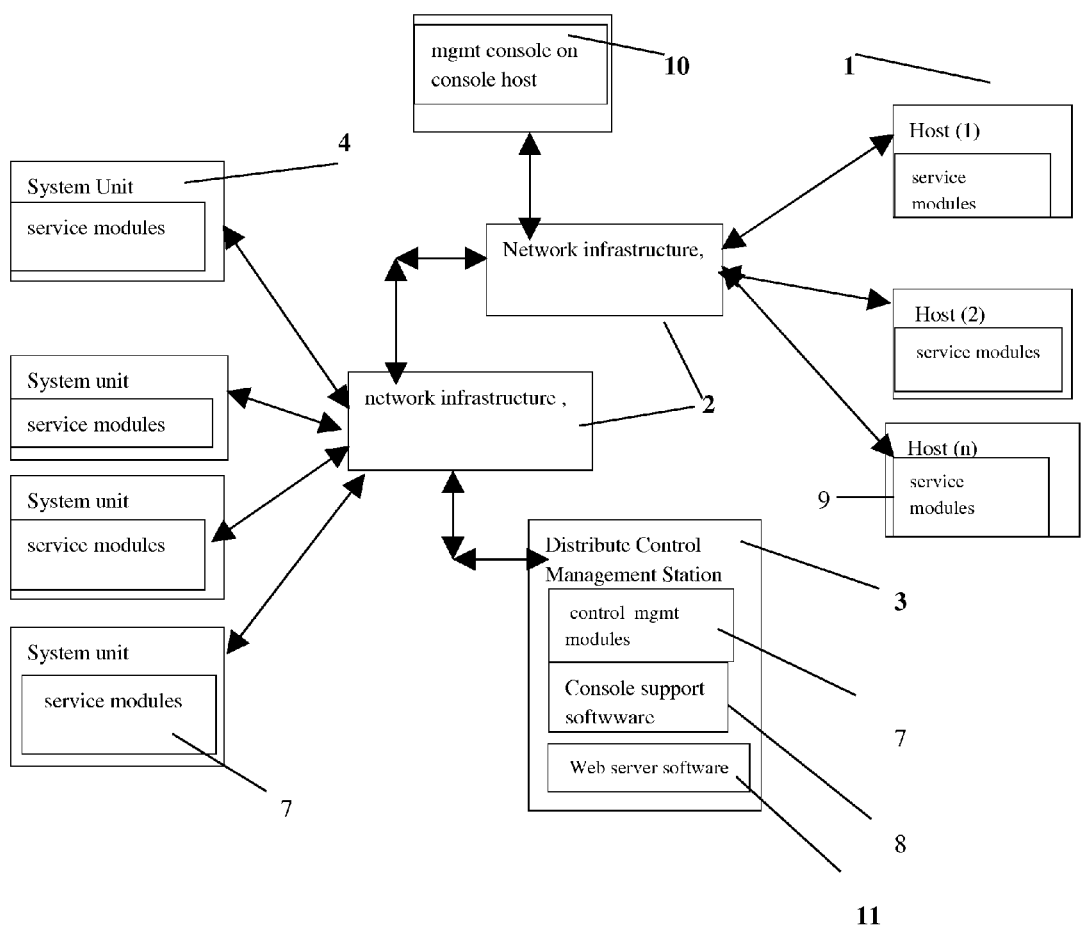
FIG. 9 illustrates a Simplified Diagram of Central Controlled Distributed Scalable Virtual Machine System in accordance with one embodiment of the present invention.

FIG. 9 is a Simplified diagram of central controlled distributed scalable virtual machine. With this invention, the systems in a CCDSVM can be flexibly organized into multiple different service pools according to their functionalities. For example, multiple IP SAN units can form a virtual SAN storage pool. The hosts of the CCDSVM could form other service pools to provide services other than storage services such as video services, security monitor services, and all other services provided on the worldwide web (or network).

Figure 10:
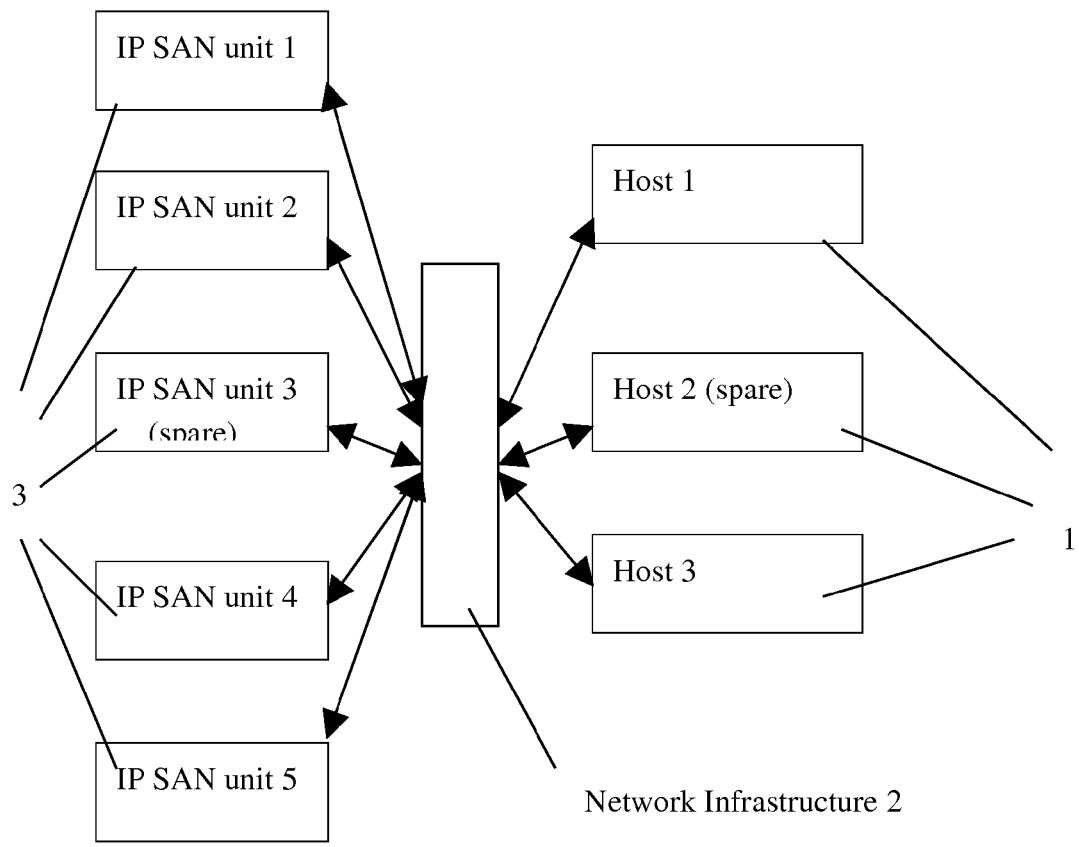
FIG. 10 illustrates a Simplified Diagram of Disaster Recovery Scheme of Distributed Virtual SAN Infrastructure in accordance with one embodiment of the present invention.

FIG. 10 is a simplified diagram of disaster recovery scheme of distributed virtual SAN infrastructure, which includes one virtual storage service pool of a plurality of IP SAN units and one service pool of a plurality of hosts. For example, host 1 accesses IP SAN units 1 and 2 while host 3 accesses IP SAN units 4 and 5. Also, IP SAN unit 1 and 2 are mirrored so that they have kept the same copy of data for host 1. The same to be true for IP SAN unit 4 and 5 with host 3. In addition, IP SAN unit 3 may be a spare unit and the host 2 could be a spare host for supporting recovery in case a fault occurred.

FIG. 1 shows a simplified diagram of a distributed virtual SAN infrastructure according to the present invention. With the distributed virtual SAN infrastructure, the distributed virtual SAN storage service pool (11) comprises one or more SAN units (4), which may be further connected to a distribute control management station (3). The SAN units (4) can be accessed by one or more hosts (1) via the network infrastructure (2). The entire distributed virtual SAN infrastructure can be operated through a management console (10).

The virtual storage volume service pool (11) of the distributed virtual SAN infrastructure (FIG. 1) can be initiated and updated when each of the IP SAN units (4) is booted and brought to online. The virtual storage volume service pool (11), in one embodiment, is updated when at least one of IP SAN units is powered down or removed from the web environment. FIG. 3 shows the distributed Virtual SAN Automatic Configuration Protocd, which leads to the success of constructing the virtual storage service pool (11) of the distributed virtual SAN infrastructure (FIG. 1) according to this invention. The followings have described the sequence steps of automatic building the storage volume service pool of the distributed virtual SAN based on the illustrated protocol (FIG. 3). The protocol described bellow could be IP based protocol such as SNMP, or a much simple UDP based protocol (FIG. 4), or any other suitable protocols.

When any one of the IP SAN units (4) such as unit (n) brought up online, SAN service modules (6 of FIG. 2) of the one of IP SAN unit (4) sends out a "SAN unit (n) startup" packet, as illustrated in FIG. 4, to the distribute control management station (3 of FIG. 1). The "SAN unit (n) startup" packet could be a simple user defined UDP packet (FIG. 4) indicating a system numbered "n" just being powered up. The message carried by the packet could also be a SNMP trap of cold start packet, or link-up packet (4 of FIG. 1) or other short packet/message of any suitable IP protocols.

When the distribute control management modules (7 of FIG. 1) of the distribute control management station (3 of FIG. 1) detects and receives the IP SAN unit (n)'s message, it stores the IP SAN unit (n)'s information, such as stored into a IP SAN unit information list for the virtual storage service pool (11).

After storing information of the IP SAN unit, the control management modules (7 of FIG. 1) on the distribute control management station (3 of FIG. 1) sends back a "need SAN unit (n)'s storage info" packet to the one of the IP SAN units (n) (4 of FIG. 1).

When the SAN service modules (6 of FIG. 1) on the one of the IP SAN units (n) (4 of FIG. 1) receive the packet of "need SAN unit (n)'s storage info", the SAN service modules 6 obtain the storage information on the one of the IP SAN units (n) (4 of FIG. 1), which may include the number of storage volumes, each of the storage volumes' starting address (logical block address, LBA), length, and the end address (logical block address, LBA). The SAN service modules (6 of FIG. 1) then send back a packet of "unit (n) storage info", which may include all information to the control management station (3 of FIG. 1).

After receiving the "unit (n) storage info" packet from the one of the IP SAN units (n) (4 of FIG. 1), the distribute control management modules (7 of FIG. 1) on the distribute control management station (3 of FIG. 1) update the stored information of the virtual storage service pool (11 of FIG. 1) with corresponding storage information of the one of the IP SAN units (n) obtained from the packet.

When an IP SAN unit number (n) is shutting down, the service module (6 of FIG. 1) of the IP SAN units number (n) (4 of FIG. 1) sends a "Unit (n) shutdown" message to the distribute control management station (3 of FIG. 1). This shutdown message could be an SNMP trap of link down, or a simple UDP packet (FIG. 4) with a message type of system down, or other short packet based on some other protocols.

After automatically detecting and receiving of the "unit (n) shutdown" packet from the IP SAN units number (n) (4 of FIG. 1), the distribute control management modules (7 of FIG. 1) on the distribute control management station (3 of FIG. 1) update the stored information of the virtual storage service pool (11 of FIG. 1), which is specific to the IP SAN unit number (n) (4 of FIG. 1), for example, updating and marking the status of the IP SAN unit number (n) as down in a entry of the IP SAN unit information list. In addition, other information may be also required to be updated, for example, updating the total storage capacity of the virtual storage service pool.

After one or more IP SAN units (4 of FIG. 1) are brought online, the control management station (3 of FIG. 1) has owned the stored information of the storage volumes and networking for all of the IP SAN units (4 of FIG. 1) in the virtual storage service pool (11 of FIG. 1). Therefore, the control management station (3 of FIG. 1) can control entire virtual SAN infrastructure. For example, the distribution control management station 3 is able to accept block data requests from each of the hosts 1 and distributed storage volumes to each of the hosts (1 of FIG. 1) based on the request in several steps.

First, an exampled host number 1 (1 of FIG. 1) sends a request to the control management station (3 of FIG. 1) to request a storage space, such as 80 GB (gigabyte) of storage volume. Second, the control management station (3 of FIG. 1) stores information of the host number 1 and searches for availability of the 80 GB of storage volume. The control management station (3), for example, finds an 80 GB available storage volume in being labeled as storage volume number 2 on an IP SAN unit number M illustrated in FIG. 6. Third, the control management station (3 of FIG. 1) sends the requested information of the host number 1 to the IP SAN unit number M (FIG. 6), wherein the requested information includes the IP address of the host number 1 and the requested storage size. The control management station (3 of FIG. 1) also sends information of the storage volume number 2 of the IP SAN unit number M to the host number 1 (1 of FIG. 1), wherein the information of the storage volume 2 includes the IP address of the IP SAN unit number M, the storage volume number and the size, the storage volume's starting address and ending logical address block (LBA). Therefore, all parties of three, namely the control management station (3) and the host number 1 and the IP SAN unit number M are synchronized for the same storage volume assignment information and host mapping. Fourth, once the host number 1 (1 of FIG. 1) and the IP SAN unit number M (FIG. 6) get each other's information, the host number 1 (1 of FIG. 1) can directly and independently access the volume 2 on the IP SAN unit number M immediately and the IP SAN unit number M, in one embodiment, is further configured to perform security checking in light of storage accessing by the host number 1.

Alternatively, the above described steps for distributing storage volume may also be semi-automatically setup with assisting of admin operations performed via the management console (10 of FIG. 1). For example, an administrator via the management console (10 of FIG. 1) could manually setup the volume 2 of the IP SAN unit number M (FIG. 6) to be exclusively accessed by the host number 1 (1 of FIG. 1) as long as the administrator acknowledges that the host number 1 needs such size of storage volume. The administrator can also manual setup the host number 1 with all information needed to access the storage volume 2 on the IP SAN unit number M (FIG. 6). Finally, the host number 1 (1 of FIG. 1) can access the storage volume 2 of IP SAN unit number M (FIG. 6) directly without going through the control management station (3 of FIG. 1).

The present invention also discloses a mechanism of dynamically expanding storage capacity. After the distributed virtual SAN storage pool (11 of FIG. 1) is initiated and constructed, each of the hosts (1 of FIG. 1) will be able to access the storage volumes of any one of the IP SAN units (4 of FIG. 1) in the pool (11 of FIG. 1) directly without further involvement of the control management station (3 of FIG. 1). This will allow the virtual storage service pool (11 of FIG. 1) of this distributed virtual SAN infrastructure (FIG. 1) to continue expanding, for example by adding one or more SAN storage units, without affecting any one of the hosts (1 of FIG. 1) to continue access the assigned storage volumes on any one of the assigned IP SAN units (4 of FIG. 1) in the virtual storage service pool 11. This means that it guarantees the distributed virtual SAN storage pool (11 of FIG. 2) can be dynamically expanded without interrupting normal storage operations and access to the entire distributed virtual SAN storage pool (11 of FIG. 2).

The present invention further discloses a technique of system scalability. Once the distributed virtual SAN storage pool (11 of FIG. 1) is constructed, each of the hosts (1 of FIG. 1) can access one or more IP SAN units (4 of FIG. 1) in the virtual storage service pool (11 of FIG. 1) of the distributed virtual SAN infrastructure (FIG. 1) whenever each of the hosts 1 sends a request. For example, a host numbered 1 (FIG. 6) can access three IP SAN units that numbered as SAN unit 1, unit 2, and unit M (see FIG. 6) after the host number 1 (FIG. 1) requests for storage volumes and the control management station (3 of FIG. 1) grants each of the requests. This effectively provides scalable storage system for each of the hosts (1 of FIG. 1) within distributed virtual SAN infrastructure (FIG. 1) of this invention. Further, the distributed virtual SAN infrastructure (FIG. 1) provides far better scalability than the in-band accessed virtual SAN (FIG. 8), wherein the scalability of in-band accessed virtual SAN were severely limited by the bottlenecked control management station (FIG. 8).

The present invention also discloses a method of storage sharing mechanism. Once the distributed virtual SAN storage pool (11 of FIG. 1) is constructed, each of the IP SAN units (4 of FIG. 1) in the virtual storage service pool of the distributed virtual SAN infrastructure (FIG. 1) may be configured with multiple storage volumes in the form of block data, which can be accessed by one or more hosts (1 of FIG. 1). Therefore, multiple hosts (1 of FIG. 1) are allowed to share storage volumes on any one of the IP SAN units (4 of FIG. 1) by granting and assigning each of the hosts to exclusively access one of the storage volumes on the one of the IP SAN units (4 of FIG. 1). The FIG. 6 demonstrates such a storage sharing, wherein the IP SAN unit number 2 of FIG. 6 has three volumes, which named volume 1, volume 2, and volume 3. The block data service modules (6 of FIG. 1) on the IP SAN unit number 2 of FIG. 6 allows volume 1 to be accessed exclusively by a host number 1 while volume 2 to be accessed exclusively by a host number 2.

Figure 7:
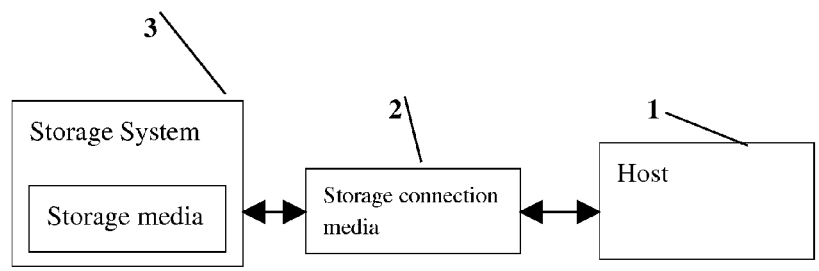
FIG. 7 is a conventional Direct Attached Storage System.

With in-band accessed virtual SAN (FIG. 8), the control management station could be a performance bottleneck. With distributed virtual SAN of this invention, each of the hosts (1 of FIG. 1) can directly and independently access any of the IP SAN units (4 of FIG. 1). Therefore, the performance of storage accessing for each of the hosts will not be affected and can match the performance of direct attached storage system (FIG. 7) when the high speed network connecting media is deployed in the distributed virtual SAN infrastructure (FIG. 1).

The present invention also illustrates a method of a centralized management of distributed virtual SAN. The storage management console 10 on a console host 14 of FIG. 1 can communicate with the console support software module 8 of FIG. 1 on a control management station 3 of FIG. 1. The storage management console 10 is configured to further receive information relating to all of the IP SAN units (4) from the control management modules 7 of FIG. 1 of the control management station 3 of FIG. 1. Therefore, via the storage management console 10, admin user can perform centralized management functionality for the entire SAN units 4 in the distributed virtual SAN storage pool (11 of FIG. 1), the hosts (1 of FIG. 1), and the control management station itself (3 of FIG. 1). With web based multiple concurrent tasks controlled by the console support software modules (8 of FIG. 1) of the control management station (3 of FIG. 1), the admin user via the storage management console (10 of FIG. 1) can perform a full range of system operations and tasks, where each of tasks and operations can be run concurrently throughout the entire distributed virtual SAN and the hosts. These management tasks include storage configuration, storage volume allocation, de-allocation, and assignment for storage distribution, storage partitioning and repartitioning, and monitoring of storage, network, and other resource usages and activities.

In one embodiment, the present invention discloses a process of disaster recovery capabilities. The use of DNS or an IP address identification mechanism helps this distributed virtual SAN infrastructure to overcome the geometric (region) limitation, and works well in a cross network domain environment or in a single network domain environment. Therefore, any of the IP SAN units or hosts as well as a control management nation could be anywhere on the corporate Intranet, department LAN, or Internet. As a result, the present invention can be used for an emergency or a disaster recovery plan of the distributed virtual SAN infrastructure that can go beyond 100 miles as oppose to the traditional 10-kilometer limitation.

In addition, the disaster recovery plan of distributed virtual SAN infrastructure can be flexibly implemented as showing in FIG. 10. With this recovery plan, the host number 1 or host number 3 (1 of FIG. 10) can continue to operate even if one of mirrored IP SAN units, which serves the host number 1 and host number 3, failed (3 of FIG. 10). Also, a spare IP SAN unit can be used to quickly replace a failed of the IP SAN units whenever there is a need. On the other hand, the hosts (1 of FIG. 10) also can be organized into a service pool for providing special services, such as distributing video services, distributed database pool, distributed security monitor services, and all other services provided cross the network or the World Wide Web. Therefore, whenever host 1 or host 3 failed, either one of them can be quickly replaced by a spare host 2 for continuing accessing the storage volumes on the assigned IP SAN unit and to continue providing services to the end user computing devices.

It should be noted that the storage of any IP SAN unit can be shared and accessed by multiple hosts. To scale a virtual storage, a host may be assigned to access multiple volumes of storage capacities from multiple IP SAN units. In one embodiment, the storage accessing goes directly through communication link between hosts and SAN units, which means that it is an out-band access. An advantage of using the present invention is that it has better performance and scalability than that in-band accessed virtual SAN. Furthermore, the present invention allows the virtual storage pool to expand dynamically through adding more IP SAN units into the storage service pool without interrupting systems operation.

The implementation of the distributed virtual SAN infrastructure allowing it to be managed and monitored from a centralized console. Also, the IP based distributed virtual SAN infrastructure is a new type of central controlled distributed scalable virtual machine (CCDSVM). The software modules used in IP based distributed virtual SAN infrastructure are web based operating system models. Furthermore, the methods and principles of automatically building the IP based distributed virtual SAN storage pool can be applied to automatically build service pools and deliver various services to the end users or clients on-demand bases.

What is claimed is:

1. A method for executing a storage communication protocol between a control server and a plurality of storage servers in a computing system for automatically constructing a storage service pool across a communication network, the method comprising sequence steps of:
   a) sending automatically, by a first one of the storage servers, a packet to the control server to inform the control server that the first one of the storage servers is going online when the first one of the storage servers is brought online;
   b) receiving, by the control server, the packet sent from the first one of the storage servers, and storing identification information of the first one of the storage servers, obtained via the packet, on the control server for the storage service pool, and
   c) sending an enquiry packet back to the first one of the storage servers for requesting storage information of the first one of the storage servers for supporting storage volume distribution and storage management;
   d) receiving, by the first one of the storage servers, the enquiry packet sent from the control server, and
   e) sending a response packet to the control server, wherein the response packet comprises the storage information including information of at least a storage volume configured in the first one of the storage servers; and
   f) receiving, by the control server, the response packet sent from the first one of the storage servers, and updating the stored information for the storage service pool with the storage information of the first one of the storage servers obtained via the response packet.

2. The method of claim 1, wherein said executing a storage communication protocol comprises:
   executing said storage communication protocol between the control server and at least a second one of the storage servers for the second one of the storage servers to join the storage service pool when the second one of the storage servers is brought online.

3. The method of claim 1, wherein said updating the storage service pool further comprises:
   automatically updating status for the storage service pool in response to changing status of any one of the storage servers, wherein the changing status comprises adding, shutdown, disconnecting, or reconnecting any one of the storage servers.

4. The method of claim 3, comprising:
   updating size of total storage capacity for the storage service pool in response to the changing status of any one of the storage servers.

5. The method of claim 1, wherein said identification comprises name and network address of each of the storage servers, said storage information comprises information of at least a storage device configured in the each of the storage servers, and said information of the storage volume comprises start address and size of the storage volume configured in the storage device.

6. The method of claim 1, wherein said communication network is one of a corporate storage network backbone, corporate Intranet, Internet, local area network ("LAN"), or wide area network ("WAN"), and comprises of wired and wireless communication links.

7. The method of claim 1 further comprising:
   configuring each of the storage servers to be an Internet Protocol ("IP") based storage server, and
   executing the storage communication protocol between the control server and each of the IP storage servers to automatically form an IP SAN storage service pool.

8. The method of claim 1 further comprising:
   configuring each of the storage servers to be a fiber channel based storage server, and
   executing the storage communication protocol between the control server and each of the fiber channel storage servers to automatically form a fiber channel SAN storage service pool.

9. The method of claim 1 further comprising:
   configuring the storage servers to comprise Internet Protocol (hereinafter "IP") storage servers, and fiber channel storage servers that are connected to the control server via a fiber channel to IP gateway; and
   executing the storage communication protocol between the control server and each of the storage servers to automatically form a storage service pool.

10. A method for distributing storage volumes in a web system that has at least a control server, a plurality of host computing devices, and a plurality of storage servers scattered across a network infrastructure, the method comprising:
    collecting, via the control server, storage information automatically from each of the storage servers to automatically form a storage service pool across the network infrastructure;
    receiving, by the control server, a first request for a storage volume in respect to storage capacity requirement of a first one of the host computing devices;
    identifying a first one of the storage servers, via the storage service pool, that has an available storage volume for the first request and distributing the first request to the identified first one of the storage servers; and
    permitting the first one of the host computing devices to directly access the identified available storage volume resided in the first one of the storage servers independent of the control server.

11. The method of claim 10, wherein said distributing the first request further comprises:
    distributing and synchronizing a map to the first one of the storage servers and the first one of the host computing devices,
    the map comprising information of the first one of the storage servers, the first one of the host computing devices, and starting address and size of the available storage volume resided in the first one of the storage servers.

12. The method of claim 10 further comprising:
distributing a second request for a storage volume to a second one of the storage servers via the storage service pool when the first one of the storage servers does not have an available storage volume for the second request while the second one of the storage servers has, otherwise distributing the second request to the first one of the storage server.

13. The method of claim 12, further comprising:
sending the first or second request to the control server via an admin effort or via an automatic requesting performed by the first one of the host computing devices in when the first one of the host computing devices requires more storage capacity.

14. The method of claim 13, wherein the first one of the host computing devices is further allowed to exclusively and directly access each of the available storage volumes resided in each of the first and second one of storage servers concurrently independent of the control server.

15. The method of claim 13, further comprising:
sending the second request to the control server via an admin effort or via an automatic requesting performed by a second one of the host computing devices when the second one of the host computing devices requires more storage capacity.

16. The method of claim 10, wherein the control server controls automatically forming, and scale up or scale down the storage service pool via executing a storage service pool automatically construction protocol between the control server and each of the storage servers.

17. The method of claim 10 further comprising:
de-allocating an identified storage volume in response to changing status of the storage service pool.

18. The method of claim 10, further comprising:
displaying the web system via a user interface (hereinafter "UI") to a console device for allowing via the UI to manage or monitor operations of storage, network, or process/thread for each of the storage servers or for each of the host computing devices.

19. A web system supporting distribution of storage volumes, the web system comprising:
a plurality of storage servers automatically forming a storage service pool, wherein each one of the storage servers is configured to provide a storage area network ("SAN") service;
a plurality of host computing devices, wherein each of the host computing devices is allowed to utilize at least a storage volume resided in any one of the storage servers for providing web services to a plurality of end-user computing devices; and
a control server communicating to each of the storage servers and each of the host computing devices across a network infrastructure for controlling operations of the web system, the controlling operations comprising to distribute storage volumes as followings:
receiving a first request for a storage volume in respect to storage capacity requirement of a first one of the host computing devices;
identifying a first one of the storage servers, via the storage service pool, that has an available storage volume for the first request, and distributing the first request to the identified first one of the storage servers; and
permitting the first one of the host computing devices to directly access the identified available storage volume on the first one of the storage servers independent of the control server.

20. The web system of claim 19, wherein each of the host computing devices is configured for receiving, executing and responding to each request distributed from the control server, and for requesting and accessing one or more storage volumes on any one of the storage servers.

21. The web system of claim 19, wherein each of the storage servers is configured for automatically providing information to the control server to form the storage service pool, for receiving, executing and responding to each request distributed from the control server, and for providing storage services to at least one of the host computing devices.

22. The web system of claim 19, wherein said distributing the first request comprises:
distributing and synchronizing a map to the first one of the storage servers and the first one of the host computing devices, the map comprising information of the first one of the storage servers, the first one of the host computing devices, and starting address and size of the available storage volume resided in the first one of the storage servers.

23. The web system of claim 19 further comprising:
distributing a second request for a storage volume to a second one of the storage servers via the storage service pool when the first one of the storage servers does not have an available storage volume for the second request while the second one of the storage server has, otherwise, distributing the second request to the first one of the storage server.

24. The web system of claim 19, wherein the control server controls
automatically forming the storage service pool across a first communication network of the network infrastructure via executing a storage service pool automatic construction protocol between the control server and each one of the storage servers.

25. The web system of claim 19, wherein the control server controls
automatically forming at least an application service pool across a second communication network of the network infrastructure via executing an application service pool automatic construction protocol between the control server and each one of the host computing devices.

26. The web system of claim 23, further comprising:
sending the first or second request to the control server via an admin effort or via automatic requesting performed by the first one of the host computing devices when the first one of the host computing devices requires more storage capacity.

27. The web system of claim 23, further comprising:
sending the second request to the control server via an admin effort or via an automatic requesting performed by a second one of the host computing devices when the second one of the host computing devices requires more storage capacity.

28. The web system of claim 19, wherein said network infrastructure is one of a corporate storage network, corporate Intranet, Internet, local area network ("LAN") or wide area network ("WAN"), and comprises of wired and wireless communication links.

29. A web based system controlling to automatically form a storage service pool for storage management, the web based system comprising:
at least a plurality of storage servers and a control server;

wherein the control server controls automatically forming the storage service pool across the communication network via executing a storage service pool automatic construction protocol between the control server and each one of the storage servers.

30. The web based system of claim 29, wherein each of the storage servers is configured for automatically providing information of the storage server to the control server for forming the storage service pool, for receiving, executing and responding to request distributed from the control server, and for providing storage service to at least a host computing device.

31. The web based system of claim 29, wherein said communication network is one of a corporate storage network, corporate Intranet, Internet, local area network ("LAN"), or wide area network ("WAN"), and comprises of wired and wireless communication links.

32. The web based system of claim 29, wherein said automatically forming the storage service pool further comprises:
displaying the storage service pool via a user interface (hereinafter "UI") to a console device, the displayed storage service pool comprising storage volumes obtained from each of the storage servers for allowing via the UI to manage the storage service pool.

33. The web based system of claim 32, wherein said managing the storage service pool comprises:
performing tasks of data replication, or storage operations of storage configuration, partitioning, backup or restore for each of the storage servers.

34. A computer program product for a control server controlling a plurality of storage servers to form a storage area network ("SAN") storage service pool, tangibly stored in a non-transitory computer-readable medium,
the computer program product comprising:
program instructions to be executed by the control server and program instructions to be executed by each of the storage servers for carrying out a storage service pool automatic construction protocol between the control server and each of the storage servers to automatically form the SAN storage service pool,
the protocol being executed comprising steps of:
a) sending automatically, by a first one of the storage servers, a packet to the control server to inform the control server that the first one of the storage servers is going online when the first one of the storage servers is brought online;
b) receiving, by the control server, the packet sent from the first one of the storage servers, and storing identification information of the first one of the storage servers, obtained via the packet, on the control server for the storage service pool, and
c) sending an enquiry packet back to the first one of the storage servers for requesting storage information of the first one of the storage servers for supporting storage volume distribution and storage management;
d) receiving, by the first one of the storage servers, the enquiry packet sent from the control server, and
e) sending a response packet to the control server, wherein the response packet comprises the storage information including information of at least a storage volume configured in the first one of the storage servers; and
f) receiving, by the control server, the response packet from the first one of the storage servers, and updating the stored information for the storage service pool with the storage information of the first one of the storage servers obtained via the response packet.

35. The computer program product of claim 34, further comprising:
executing said storage service pool automatic construction protocol between the control server and at least a second one of the storage servers for the second one of the storage servers to join the storage service pool when the second one of the storage servers is brought online.

36. The computer program product of claim 34, wherein said updating the storage service pool further comprises a step of:
automatically updating status for the storage service pool in response to changing status of any one of the storage servers, wherein the changing status comprises adding, shutdown, disconnecting, or reconnecting any one of the storage servers.

37. The computer program product of claim 34, wherein said updating status comprises:
updating total storage capacity size of the storage service pool in response to the changing status of any one of the storage servers.

38. The computer program product of claim 34, wherein said identification comprises name and network address of one of the storage servers, said storage information comprises information of at least a storage device configured in the one of the storage servers and said information of the storage volume comprises start address and size of the storage volume configured in the storage device.

39. The computer program product of claim 34, wherein said communication network is one of a corporate storage network backbone, corporate Intranet, Internet, local area network ("LAN"), or wide area network ("WAN"), and comprises of wired and wireless communication links.

* * * * *

UNITED STATES PATENT AND TRADEMARK OFFICE
CERTIFICATE OF CORRECTION

Page 1 of 2

PATENT NO.        : 8,639,788 B2
APPLICATION NO.   : 12/013813
DATED             : January 28, 2014
INVENTOR(S)       : Sheng Tai Ted Tsao It is certified that error appears in the above-identified patent and that said Letters Patent is hereby corrected as shown below:

IN THE SPECIFICATION:
In col. 3 line 18 and col. 4 line 30 please replace
   "management nation" with -- management station --;
In col. 3, line 35, please replace
   "Ethernet cable or" with --Ethernet cable or other media for deploying--;
In col. 3, line 36-37, please replace 3 occurrences of
   "connection media protocol" with --protocol--;
In col. 3, line 38, please replace
   "Fibre-Channel." with --Fiber Channel protocol--;
In col. 4, line 27, please replace
   "system A to a system" with --system A to a system B--;
In col. 5, line 32, please replace
   "to any one of" with --to the each of--;
In col. 5, line 37, please replace
   "and organizes" with --organizes--;
In col. 6, lines 26, please replace
   "a protocol of" with --a protocol for--;
In col. 6, lines 27, please replace
   "shutting down a virtual SAN" with --shutting down--;
In col. 7, line 22, please replace
   "protocd" with --protocol--;

IN THE CLAIMS:
In col. 11, line 47; col., 12, lines 7-8, col. 13, line 51; col. 14, line 42; col. 15, lines 11-12; col. 16, line 9, please replace
   "at least a" with --at least one--;
In col. 11, lines 66-67, col. 12, line 3, and in col. 16, line 31, please replace
   "any one of" with --the any one of--;

Signed and Sealed this
Thirteenth Day of May, 2014

Michelle K. Lee
*Deputy Director of the United States Patent and Trademark Office*

CERTIFICATE OF CORRECTION (continued)
U.S. Pat. No. 8,639,788 B2

In col. 13, line 14, in col. 13, line 26, and in col. 14, line 55, please replace
   "via an automatic" with --via automatic--;
In col. 13, lines 16, please replace
   "devices in" with --devices--;
In col. 13, line 40, and in col. 15, line 21, please replace
   "to a console" with --on a console--;
In col. 14, line 3, and in col. 14, line 9, please replace
   "on" with --in--;
In col. 14, line 6; col. 14, line 11; and col. 15, line 7, please replace
   "is configured" with --is operable--;
In col. 15, line 2, please replace
   "across the" with --across a--;
In col. 14, line 14 and col. 15 line 11, please replace
   "providing" with --delivering--.